(12) United States Patent  (10) Patent No.: US 7,803,056 B2
Nosaka et al.  (45) Date of Patent: Sep. 28, 2010

(54) POWER TRANSMISSION DEVICE

(75) Inventors: Michiyasu Nosaka, Anjo (JP); Yasuo Tabuchi, Toyoake (JP); Motohiko Ueda, Okazaki (JP); Yoshiki Tada, Okazaki (JP)

(73) Assignee: DENSO CORPORATION, Kariya (JP)

( * ) Notice: Subject to any disclaimer, the term of this patent is extended or adjusted under 35 U.S.C. 154(b) by 732 days.

(21) Appl. No.: 11/370,939

(22) Filed: Mar. 9, 2006

(65) Prior Publication Data

US 2006/0217203 A1 Sep. 28, 2006

(30) Foreign Application Priority Data

Mar. 23, 2005 (JP) ............................. 2005-084415
Mar. 25, 2005 (JP) ............................. 2005-089810

(51) Int. Cl.
*F16D 7/02* (2006.01)

(52) U.S. Cl. .............................. 464/30; 464/32; 474/70

(58) Field of Classification Search ................... 464/32, 464/33, 30, 47; 474/70, 903; 403/2; 417/319
See application file for complete search history.

(56) References Cited

U.S. PATENT DOCUMENTS

| 2003/0017909 A1 | 1/2003 | Murase et al. |
| 2003/0130044 A1 | 7/2003 | Kanai et al. |
| 2003/0194263 A1 | 10/2003 | Ueda et al. |
| 2005/0239555 A1 | 10/2005 | Ueda et al. |

FOREIGN PATENT DOCUMENTS

| JP | A-2003-35225 | 2/1973 |
| JP | A-59-110429 | 7/1984 |
| JP | U-61-054558 | 4/1986 |
| JP | A-09-196186 | 7/1997 |
| JP | A-11-13696 | 1/1999 |

(Continued)

OTHER PUBLICATIONS

U.S. Appl. No. 11/251,774, filed Oct. 18, 2005.

(Continued)

*Primary Examiner*—Aaron M Dunwoody
(74) *Attorney, Agent, or Firm*—Posz Law Group, PLC

(57) ABSTRACT

A power transmission device includes: a pulley 1 rotatably attached to a casing 9; a hub 2 connected to the pulley 1 by an engagement of protrusions with recesses; and a power shutoff member 3 interposed between the hub 2 and a rotary shaft 4. The power shutoff member and the rotary shaft 4 are joined to each other by means of screwing. When a water intrusion path formed between a hub side seating face of the hub and a shaft side seating face 44 of the rotary shaft is formed into a labyrinth structure, water is prevented from entering the seating face. An engagement portion 35 on the power shutoff member side is engaged with a hub side engagement portion 21a so that it can be accommodated in the hub side engagement portion 21a, and the power shutoff member can be rotated together when the hub is rotated. An engagement gap formed between a power shutoff member side engagement portion and a hub side engagement portion in the radial direction perpendicular to an axis of the rotary shaft is in a range from 0.001 mm to 15% of a diameter of a circumscribed circle of the power shutoff member side engagement portion.

3 Claims, 19 Drawing Sheets

FOREIGN PATENT DOCUMENTS

| | | |
|---|---|---|
| JP | A-2001-059560 | 3/2001 |
| JP | 2003-206950 A | 7/2003 |
| JP | A-2004-217095 | 8/2004 |
| JP | A-2004-263831 | 9/2004 |

OTHER PUBLICATIONS

Office Action mailed Jan. 20, 2009 in corresponding Japanese patent application No. 2005-084415 (and English translation).

Office Action mailed Jul. 28, 2009 in corresponding Japanese patent application No. 2005-089810 (and English translation).

THE PRIOR ART

POWER TRANSMISSION DEVICE

BACKGROUND OF THE INVENTION

1. Technical Field of the Invention

The present invention relates to a power transmission device having a torque limiting function. More particularly, the present invention relates to a power transmission device having a torque limiting function preferably used when it is incorporated in a constant-operation type compressor, of an air conditioner for vehicle use, driven by an external power source such as an engine via a belt and others.

2. Description of the Related Art

A refrigerant compressor used for an air conditioner for vehicle use is driven by an external power source such as an engine via a belt, a pulley and others. In this case, in order to disconnect the refrigerant compressor from the engine, an electromagnetic clutch may be interposed between them. However, when the electromagnetic clutch is not incorporated between them, it is possible to reduce the manufacturing cost. Therefore, the electromagnetic clutch is omitted in many cases. In this case, in a power transmission device of the compressor, used for the air conditioner for vehicle use, driven by the external power source such as an engine, a torque limiter is provided to avoid the occurrence of a problem such as cutting of a belt when the compressor has seized.

For example, according to the official gazette of JP-A-2003-206950, a portion of a power transmission is engaged by means of screwing.

In this torque limiter system in which an engagement of screwing is used, by utilizing an excessively high axial tension generated in the screw engaging portion by an excessively high torque when a compressor has seized, a portion of a power transmission path is broken, so that the power transmission path can be cut off.

As this torque limiter system utilizes a screw engagement, the accuracy of operation of the limiter is affected by an intensity of torque generated at the time of seizing and by a coefficient of friction of the screw portions which are an engagement portion and seating faces.

Especially, according to the prior art shown in FIG. 5A in which a flat washer is used for the washer 8 coming into contact with the rotary shaft 4 of a compressor, for example, a seating face of the flat washer 8 coming into contact with the rotary shaft 4 is corroded with age when water enters from the outside and attaches to the seating face of the flat washer 8. In this case, the coefficient of friction is changed due to the corrosion. Accordingly, an intensity of torque of the torque limiter is changed, which deteriorates the accuracy of the torque limiter.

FIG. 20 is a sectional side view showing an example of the power transmission device of the prior art into which the above torque limiter is incorporated. FIG. 21 is a partially enlarged view of FIG. 20. FIG. 22 is a partial sectional side view showing a state in which the torque limiter of the example of the prior art is operated.

As shown in FIGS. 20 to 22, in the power transmission of a comparative example, the power shutoff member (the torque limiter) 3 is connected to the rotary shaft 4 of a compressor (not shown) by the screw portion 33 being screwed. Further, the power shutoff member (the torque limiter) 3 is connected to the inner hub 21 of the hub 2 provided on the pulley side by means of spigot engagement. When an axial shift is caused between the power shutoff member 3 and the inner hub 21, as shown in FIG. 21, a gap d is generated between the engagement portion 35 of the power shutoff member 3 and the engagement portion 21a of the inner hub 21. Therefore, the chamfered portion 21b of the hub 2 interferes with the root-rounded portion 36 of the power shutoff member 3, which affects a torque limiting characteristic of the power shutoff member 3. That is, a breaking force, which is determined by an axial tension acting on a sectional area of the breaking portion 34 of the power shutoff member 3 and substantially proportional to the given torque, is affected by a resistance force generated by the interference of the chamfered shape 21b with the root-rounded portion 36. Further, as can be understood from FIG. 22, unless a caulked portion is provided in the large outer diameter portion 31 of the power shutoff member 3, the large outer diameter portion 31 falls off at the time of operation of the torque limiter.

This torque limiter system is operated in such a manner that the power shutoff member is cut apart by an excessively high axial tension, which is generated by screw engagement, by utilizing an excessively high intensity of torque generated in the phenomenon of seizing of a compressor. In this case, the following problems may be encountered. An axis of the power shutoff member is shifted from an axis of the inner hub accommodating the power shutoff member. Therefore, it is impossible to obtain a stable power shutoff characteristic. At the time of operation of the power shutoff member, a breaking portion provided between the screw portion side and the large outer diameter portion is cut apart by an axial tension. After the completion of operation of the power shutoff member, the large outer diameter portion falls off.

In order to solve the above problems, a method is provided in which the large outer diameter portion, which is a portion of the power shut-off member, is press-fitted and fixed into the inner hub so as to prevent the occurrence of an axial shift and the large outer diameter portion is fixed by the press-fitted portion to prevent a disconnection of the large outer diameter portion at the time of operation of the torque limiter of the power shutoff member. However, when this method is adopted, stress is generated by press-fitting in a portion which affects the limiter operation characteristic of the power shutoff member, which has a poor influence on the power shutoff characteristic. Therefore, it is impossible to solve the above problems.

SUMMARY OF THE INVENTION

The present invention has been accomplished to solve the above problems. An object of the present invention is to provide a power transmission device in which a change in a coefficient of friction on a seating face of a washer is suppressed and a torque limiter can be stably operated with high accuracy in a mechanical torque limiter system in which a portion of a power transmitting path is engaged by means of screwing.

Another object of the present invention is described as follows. In a power transmission device of a torque limiter system utilizing screw engagement, an engagement portion, in which a power shutoff member and an inner hub for accommodating the power shutoff member are engaged with each other by a spigot engagement. Further, an engagement portion of the inner hub is slightly caulked. Due to the foregoing, an axial shift between the power shutoff member and the inner hub is prevented and a stable power shutoff characteristic is obtained, and a large outer diameter portion of the power shutoff member is prevented from falling off after the completion of operation of the torque limiter. In this way, a power transmission device of high performance is provided at a low manufacturing cost.

A power transmission device of one aspect of the present invention comprises: a pulley 1 rotatably attached to a casing 9; a hub 2 connected to the pulley 1 by an engagement of protrusions with recesses; and a power shutoff member 3, which is interposed between the hub 2 and a rotary shaft 4. The power shutoff member 3 and the rotary shaft 4 are joined to each other by screw engagement. A water intrusion path, which is formed between a hub side seating face 25 of the hub 2 and a shaft side seating face 44 of the rotary shaft 4, is formed into a labyrinth structure. Due to the above structure, an intrusion of water onto the seating faces 25, 44 is suppressed. Therefore, a change in the friction coefficient, which is caused by a change with age such as corrosion, can be prevented, and the torque limiter accuracy can be stably maintained.

In a power transmission device of the present invention, the labyrinth structure is formed when an annular flange portion 81 protruding to the rear side in the axial direction is provided in a washer 8 which is arranged between the hub 2 and the rotary shaft 4. Therefore, due to a labyrinth effect, which is caused by an inner circumferential face 84 of the annular flange portion 81 and an outer circumferential face 45 of the rotary shaft 4, an intrusion of water into the seating face 82 of the washer 8 can be prevented.

In a power transmission device of the present invention, an engagement portion for partially receiving the washer 8 is formed on the hub side seating face 25. Due to the foregoing, the washer 8 can be press-fitted into the engaging portion 28. Therefore, an intrusion of water can be prevented.

In a power transmission device of the present invention, the labyrinth structure is formed when an annular hub side flange portion 26, which protrudes in the axial direction to the rear side so as to partially cover the rotary shaft 4, is provided on the hub side seating face 25. In this case, an intrusion of water onto the contact face of the hub 2 and the rotary shaft 4 can be prevented without arranging the washer 8.

In a power transmission device of the present invention, the labyrinth structure is formed out of a ring member 92, which is arranged above the flat washer 8 interposed between the hub side seating face 25 and the shaft side seating face 43 and which is provided on an inner circumferential face of a boss portion 91, having a protruding portion, the forward end portion of which protrudes to the front side. Therefore, even in a case in which the conventional flat washer 8 is used, this labyrinth structure can be composed.

In a power transmission device of the present invention, the hub 2 includes: an inner hub 21; a outer hub 23; a cylindrical portion 22 made of an elastic member; and a hub side protrusion and recess portion 24, wherein the center β in the axial direction of the hub side protrusion and recess portion 24 is offset to the rear side by both the offset ε from the center α in the axial direction of the cylindrical portion. Due to the above structure, the space S can be ensured on the front face of the hub side protrusion and recess portion 24, and the outer hub 23 in an upper portion of the cylindrical portion 22 of the elastic member can be drawn. Therefore, the durability of the cylindrical portion 22 can be maintained. It is possible to arrange a balancer (not shown) by utilizing the space S.

A power transmission device of another aspect of the present invention comprises: a rotary portion 1, capable of rotating, to which a rotary drive power is transmitted from a drive source; a power shutoff member 3, which is a power shutoff member 3 for shutting off transmission of an excessively high torque between the rotary portion 1 and a rotary shaft 4 of a device to be driven, joined to the rotary shaft 4 by means of screwing so as to be integrally rotated; and a hub 2, one side of which is connected to the rotary portion 1, the other side of which is connected to the power shutoff member 3. In the power transmission device, a power shutoff member side engagement portion 35 provided in the power shutoff member 3 is engaged so that it can be accommodated in a hub side engagement portion 21a provided in the hub 2, and the power shutoff member 3 is rotated together by a rotation of the hub 2. An engagement gap in the radial direction perpendicular to an axis of the rotary shaft 4 between the power shutoff member side engagement portion 35 and the hub side engagement portion 21a is not less than 0.001 mm and an upper limit of the gap is in a range of 15% of a diameter of a circumscribed circle of the power shutoff member side engagement portion 35.

Due to the above structure, in a torque limiter type power transmission device in which the above screw joining is utilized, when the power shutoff member and the engagement portion of the inner hub for accommodating the power shutoff member are subjected to spigot engagement with a predetermined tolerance, it is possible to prevent an axial shift caused between the power shutoff member and the inner hub. Therefore, the power shutoff characteristic can be stabilized. Due to the foregoing, it is possible to supply a power transmission of high performance at a low manufacturing cost.

In the present invention, the upper limit of the engagement gap is 3 mm at the maximum.

According to the present invention, the maximum value of the upper limit of the engagement gap can be clarified.

In the present invention, at least a surface portion of at least one of the power shutoff member side engagement portion 35 and the hub side engagement portion 21a is made of material containing a low friction coefficient material such as PTFE, resin or molybdenum.

According to the present invention, the power shutoff characteristic of the power transmission can be further stabilized.

In the present invention, a separate member 3A is attached to one of the power shutoff member side engagement portion 35 and the hub side engagement portion 21a, and transmission of power from the hub 2 to the power shutoff member 3 is conducted between the separate body 3A and one of the power shutoff member side engagement portion 35, to which the separate body 3A is not attached, and the hub side engagement portion 21a.

According to the present invention, there is a possibility that the manufacturing cost can be reduced by making the manufacturing work of the engagement portion easy.

In the present invention, at least a surface portion of the separate body 3A is made of material containing a low friction coefficient material such as PTFE, resin or molybdenum.

According to the present invention, there is a possibility that the power shutoff characteristic of the power transmission device can be further stabilized.

According to still another aspect of the present invention, a power transmission comprises: a rotary portion 1 capable of rotating to which rotary drive power is transmitted from a drive source; a power shutoff member 3, which is a power shutoff member for shutting off transmission of an excessively high torque between the rotary portion 1 and a rotary shaft 4, joined to the rotary shaft 4 by means of screwing so as to be integrally rotated; and a hub 2, one side of which is connected to the rotary portion 1, the other side of which is connected to the power shutoff member 3. A separate member 3A is attached to at least one of the power shutoff member side engagement portion 35 and the hub side engagement portion 21a, and transmission of power from the hub 2 to the power shutoff member 3 is conducted between the separate body 3A and one of the power shutoff member side engagement portion 35, to which the separate body 3A is not attached, and the hub side engagement portion 21a so that the power shutoff member 3 can be rotated together by the rotation of the hub 2, and at least a surface portion of the separate body 3A is made of material containing a low friction coefficient material such as PTFE, resin or molybdenum.

According to the present invention, even when the tolerance of spigot engagement of the inner hub with the power shutoff member is not severely controlled, it is possible to stabilize the power transmission characteristic. Accordingly, manufacturing and assembling of the power transmission device can be made easy, which can reduce the manufacturing cost.

In the present invention, a sectional shape of each of the power shutoff member side engagement portion 35 and the hub side engagement portion 21a on a face perpendicular to the rotary shaft 4 is formed into a shape, which is not a circle, such as a hexagon, a square, a width across flat, an octagon, a decagon or a dodecagon.

According to the present invention, the structure of the first and the second engagement portion can be easily realized.

In the present invention, respective faces 31a, 21c of the power shutoff member side engagement portion 35 and the hub side engagement portion 21a, which are opposed to each other in the axial direction of the rotary shaft 4, come into contact with each other.

According to this embodiment, the structure of the power transmission of the present invention can be easily realized.

In the present invention, corner portions 36, 21b of the respective faces 31a, 21c of the power shutoff member side engagement portion 35 and the hub side engagement portion 21a, which are opposed to each other, are chamfered so that they can not interfere with each other.

According to this embodiment, the structure of the power transmission device of the present invention can be more realized.

In the present invention, on the hub side with respect to the breaking portion 34 of the power shutoff member 3, a protrusion-shaped caulking portion 21d, which acts in the radial direction, is provided on an engagement face of the hub side engagement portion 21a, a caulking recess-shaped recess portion 37 is provided in the power shutoff member side engagement portion 35 facing and corresponding to the caulking portion 21d, and a size of a gap formed between the caulking portion 21d and the caulking recess portion 37 is larger than the engagement gap.

According to the present invention, when the engagement portion of the inner hub is slightly caulked, it is possible to prevent the large outer diameter portion of the power shutoff member from falling off after the completion of operation of the torque limiter.

In the present invention, a power transmission device is connected to a compressor, which is a device to be driven, incorporated into an air conditioner for vehicle use.

According to the present invention, an embodiment is disclosed in which the use of the present invention is easily realized.

The present invention may be more fully understood from the description of the preferred embodiments thereof, as set forth below, together with the accompanying drawings.

BRIEF DESCRIPTION OF THE DRAWINGS

In the drawings:

FIG. 19 is a partially enlarged sectional view showing an engagement portion of an inner hub with a power shutoff member formed in the same manner as that of FIG. 14;

DESCRIPTION OF THE PREFERRED EMBODIMENTS

Figure 1:
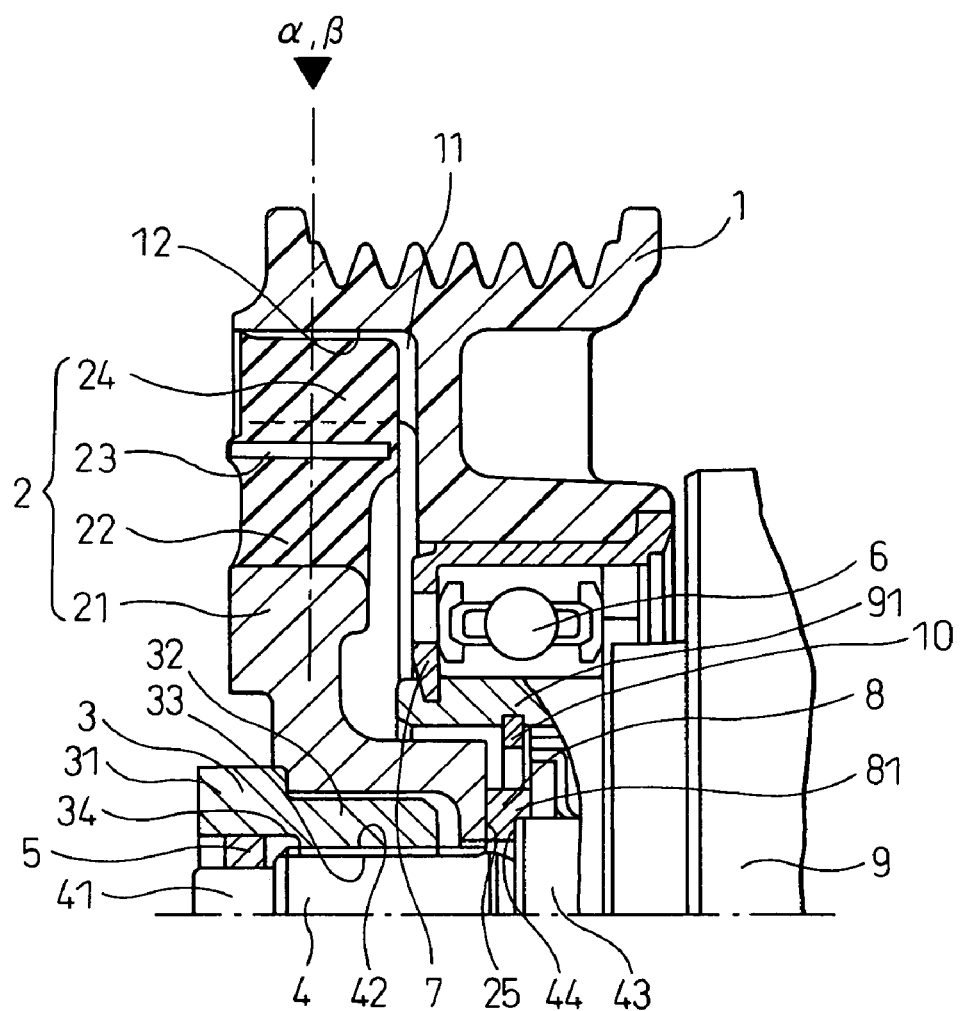
FIG. 1 is a sectional view showing an upper half of a power transmission device of a first embodiment of the present invention.
Figure 2:
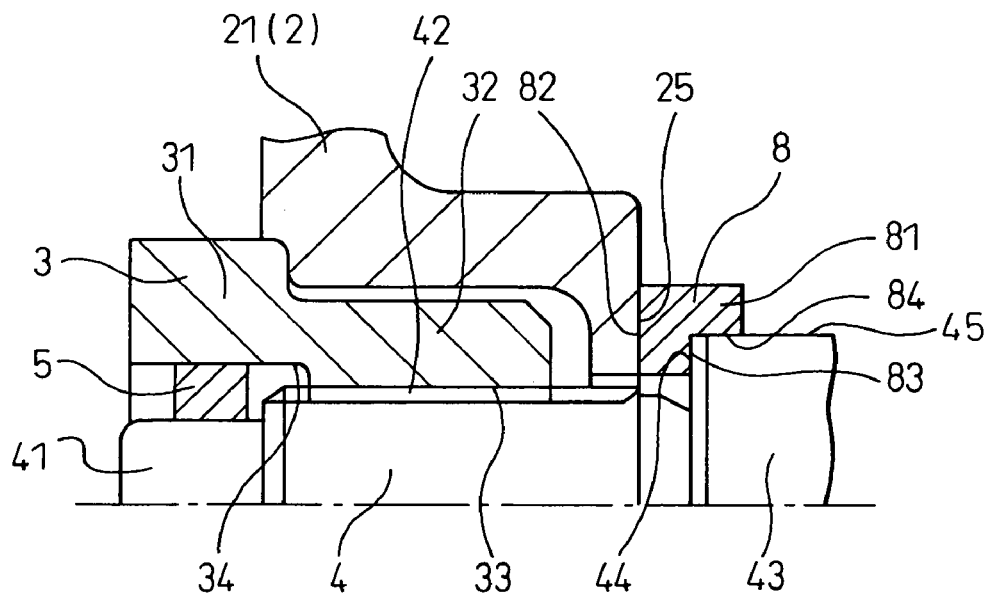
FIG. 2 is an enlarged sectional view of a primary portion of FIG. 1.

Referring to the drawings, an embodiment of the present invention will be explained below. A power transmission device of the present invention is preferably used when it is incorporated into a compressor of an air conditioner for vehicle use. FIG. 1 is a sectional view showing an upper half of a power transmission device of the first embodiment of the present invention, and FIG. 2 is an enlarged sectional view showing a primary portion of FIG. 1. A power transmission device of the present invention transmits power (torque) between a pulley 1, which is a rotary member provided on the drive side to obtain power from an engine or a motor, and a hub 2 which is a rotary member to be driven and fixed to a rotary shaft 4 of a compressor through a power shutoff member 3 which is a torque limiter. The pulley 1 and the hub 2 are arranged on the same shaft.

The pulley 1 is rotatably attached to a cylindrical boss portion 91, which is provided on one end side of a casing 9 of a compressor, via a bearing 6 and a snap ring 7 having a sleeve ring. The pulley 1 is formed out of thermoplastic synthetic resin by means of molding, however, the pulley 1 may be formed out of metal such as an iron material. In the case where the pulley 1 is made of resin, the pulley 1, the snap ring 7 having a sleeve ring and the bearing 6 are usually integrated into one body by means of insertion molding. On an outer circumferential face of the pulley 1, a belt (not shown) is wound. Therefore, the pulley 1 is rotated by power given from an outside power source such as an engine or a motor. The bearing 6 is engaged in the boss portion 91 and cannot be moved in the axial direction as it is blocked by an end portion of the boss portion 91 and the snap ring 7 having a sleeve ring which is fitted in a groove formed on the outer circumferential face of the boss portion 91. The casing 9 and the rotary shaft 4 are tightly sealed by a shaft sealing device so as to prevent refrigerant and oil from leaking outside. This shaft sealing device also cannot be moved in the axial direction as it is blocked by the snap ring 10 engaged in the groove formed on an inner circumferential face of the boss portion 91.

Figure 4:
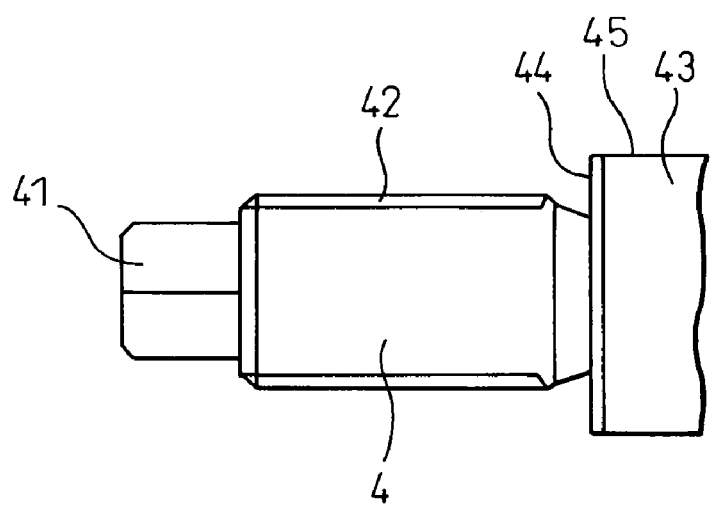
FIG. 4 is a view for explaining a structure of a forward end portion of a rotary shaft.

A forward end portion of the rotary shaft 4 of the compressor protrudes from the casing 9. As shown in FIG. 4, a forward end portion of the rotary shaft 4 includes: a tool shape portion 41, the sectional shape of which is formed into a tool shape; a screw portion 42, on the outer circumference of which a screw is formed; and a large diameter shaft portion 43, the diameter of which is larger than that of the screw portion 42, wherein a step portion is formed between the screw portion 42 and the large diameter shaft portion 43, and this step portion composes a shaft side seating face 44. In FIG. 4, the tool shape portion 41 is polygonal. A washer 8 is basically provided in contact with the shaft side seating face 44 of the rotary shaft 4. Concerning the washer 8, the present invention is characterized by this washer 8. Therefore, this washer 8 will be described in detail later. The power shutoff member 3 is fixed to the screw portion 42 of the rotary shaft 4 by means of screwing.

The power shutoff member 3, which functions as a torque limiter, includes: a large outer diameter portion 31, the outer diameter of which is large; and a small outer diameter portion 32, the outer diameter of which is small, wherein the power shutoff member 3 is formed into a square pipe shape or a cylindrical shape. The large outer diameter portion 31 is engaged with the inner hub 21 which is a portion of the hub 2 described later. On an inner circumferential face of the small outer diameter portion 32, a screw portion 33 is formed and screwed into a screw portion 42 of the rotary shaft 4. An inner diameter of the large outer diameter portion 31 is somewhat larger than an inner diameter of the small outer diameter portion 32. In a portion where the inner circumferential face of the large outer diameter portion 31 is transferred to the inner circumferential face of the small outer diameter portion 32, a cutout portion is formed, which composes a breaking portion 34. Therefore, when an excessively high axial tension is given to the power shutoff member 3, the breaking portion 34 can be easily broken.

Between the inner circumferential face of the large outer diameter portion 31 of the power shutoff member 3 and the outer circumferential face of the tool shape portion 41 of the rotary shaft 4, a packing member 5 is provided. This packing member 5 prevents water and dust from intruding into between the screw engagement portions 33, 42 of the power shutoff member 3 and the rotary shaft 4.

For example, the hub 2 includes: an inner hub 21; a cylindrical portion 22 made of elastic material; an outer hub 23; and a hub side protrusion and recess portion 24 made of elastic material. The inner hub 21 is formed into a substantially cylindrical shape. An inner circumferential face of the inner hub 21 is formed into a shape fitted to an outer circumferential face of the power shutoff member 3. Both are joined to each other by engagement. Concerning the engagement joining, the inner circumferential face of the inner hub 21 and the outer circumferential face of the power shutoff member 3 may be respectively formed into the same polygon and both may be engaged and fixed to each other. Alternatively, in the same manner as that of the joining of the rotary shaft 4 to the power shutoff member 3, both may be joined to each other by means of screw engagement. A forward end face on the rear side of the inner hub 21 (an end face on the compressor side) is a hub side seating face 25. When this a hub side seating face 25 comes into contact with the washer 8, the inner hub 21 can be held by the power shutoff member 3 and the washer 8.

The outer hub 23 is cylindrical and made of metallic material such as an iron material in the same manner as that of the inner hub 21.

The cylindrical portion 22 is made of elastic material, such as rubber or resin, and is arranged and held between the inner hub 21 and the outer hub 23 and bonded to the outer circumferential face of the inner hub 21 and the inner circumferential face of the outer hub 23 by means of adhesion. Alternatively, these three components or four components including these three components and the hub side protrusion and recess portion 24 may be integrally formed by means of insertion molding. Elastic material of the cylindrical portion functions not only as a member for transmitting torque but also as a torque damper.

On an upper face of the outer hub 23, the hub side protrusion and recess portion 24, which is made of elastic material in the same manner as that of the cylindrical portion 22, is provided. The hub side protrusion and recess portion 24 may be joined to the upper face of the outer hub 23 by means of adhesion. This hub side protrusion and recess portion 24 is engaged with a pulley side protrusion and recess portion of the pulley 1 by means of engagement of protrusions with recesses.

In the above explanations, the hub 2 includes the inner hub 21, the cylindrical portion 22, the outer hub 23 and the hub side protrusion and recess portion 24. However, it is possible to omit the outer hub 23 and compose the hub by two components of the inner hub 21 and the hub side protrusion and recess portion 24.

On the other hand, on an end face of the pulley 1 on the front side, a pocket portion 11 for receiving the hub 2 is formed. On the side of the pocket portion 11, a pulley side protrusion and recess portion 12 is formed. When this pulley side protrusion and recess portion 12 is engaged with the hub side protrusion and recess portion 24 of the hub 2, the pulley 1 and the hub 2 are joined to each other.

Figure 5A:
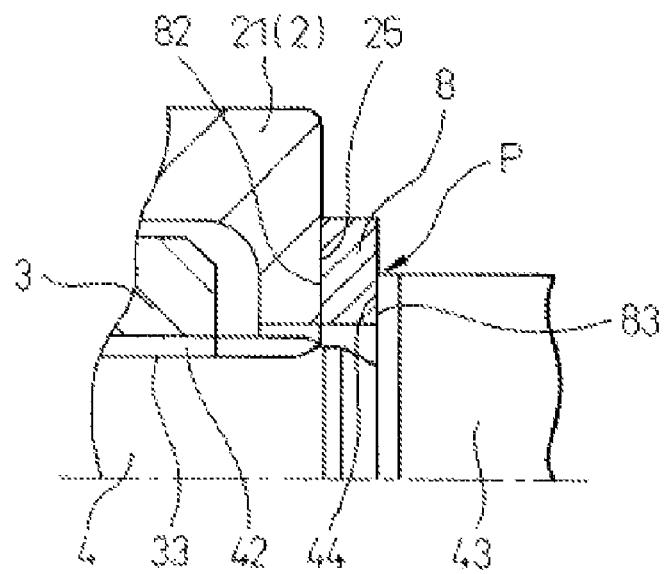
FIG. 5A is a view showing a primary portion of a power transmission device of the prior art to be compared with that of the present invention.

Next, a labyrinth structure, which is a characteristic of the present invention, will be explained below. According to the prior art explained before, as shown in FIG. 5A, the flat washer 8 is interposed between the hub side seating face 25, which is a rear side face of the hub 2 (the inner hub 21), and the shaft side seating face 44 of the rotary shaft 4. In this case, the water intrusion path P, which proceeds straight downward, is formed. Therefore, water tends to intrude from the outside. When water attaches to each components, the seating face of the flat washer 8, which comes into contact with the shaft side seating face 44 of the rotary shaft 4, is corroded with age, and the coefficient of friction is changed by the corrosion. Due to the corrosion, the torque limiter accuracy is deteriorated.

According to the present invention, when the water intrusion path P is formed into a labyrinth structure, the intrusion of water is suppressed, and the corrosion of the seating face on the washer 8, which comes into contact with the shaft side seating face 44 of the rotary shaft 4, is prevented.

Figure 3:
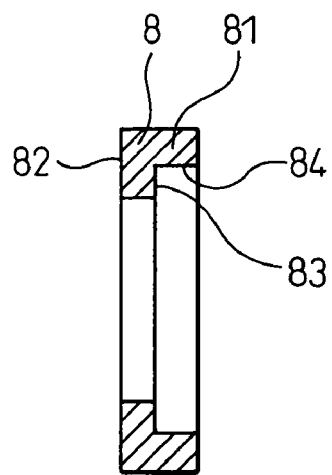
FIG. 3 is a sectional view of a washer of a power transmission device of the first embodiment.

In the first embodiment, as shown in FIGS. 2 and 3, between the hub side seating face 25 of the hub 2 (the inner hub 21) and the shaft side seating face 44 of the rotary shaft 4, the washer 8 is provided being contacted with both seating faces. In this washer 8, an annular flange portion 81, which protrudes in the axial direction to the rear side, is provided. The washer 8 having the flange portion 81 is an annular washer, the cross section of which is formed into an L-shape. This washer 8 includes: an outside seating face 82 coming into contact with the hub side seating face 25; an inside seating face 83 coming into contact with the shaft side seating face 44; and an inner circumferential portion 84 which forms a minute engagement gap on the outer circumferential face 45 of the large diameter shaft portion 43. This minute engagement gap, which is formed between the inner circumferential portion 84 of the flange portion 81 of the washer 8 and the outer circumferential face 45 of the large diameter shaft portion 43 of the rotary shaft 4, is the water intrusion path P. This gap is not less than 0.001 μm. It is preferable that an upper limit of this gap is 30% of the outer diameter of the large diameter shaft portion 43 of the rotary shaft 4.

Figure 5B:
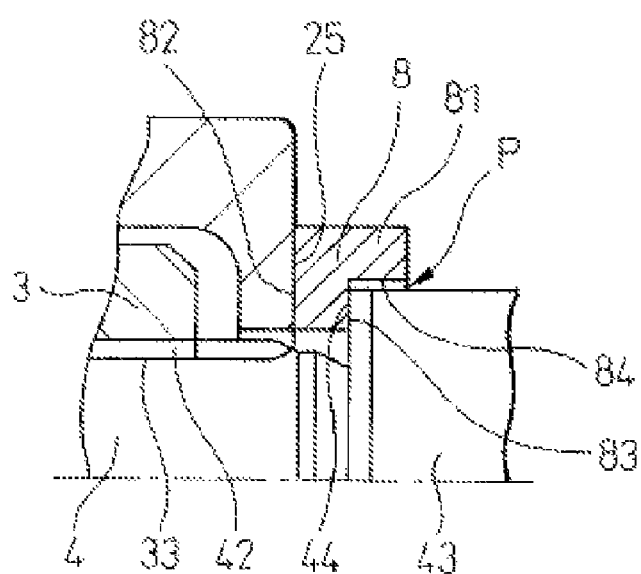
FIG. 5B is a view showing a primary portion of a power transmission device of the present invention to be compared with that of the prior art.

Accordingly, as shown in FIG. 5B, in the first embodiment, the water intrusion path P is formed between the inner circumferential portion 84 of the washer 8 and the outer circumferential face 45 of the rotary shaft 4 and directed in the axial direction. Therefore, the intrusion of water into between the seating faces 83, 44 of the washer 8 and the rotary shaft 4 can be suppressed. As the labyrinth structure is formed by changing the shape of the washer 8 in the first embodiment, the intrusion of water can be prevented.

Figure 6:
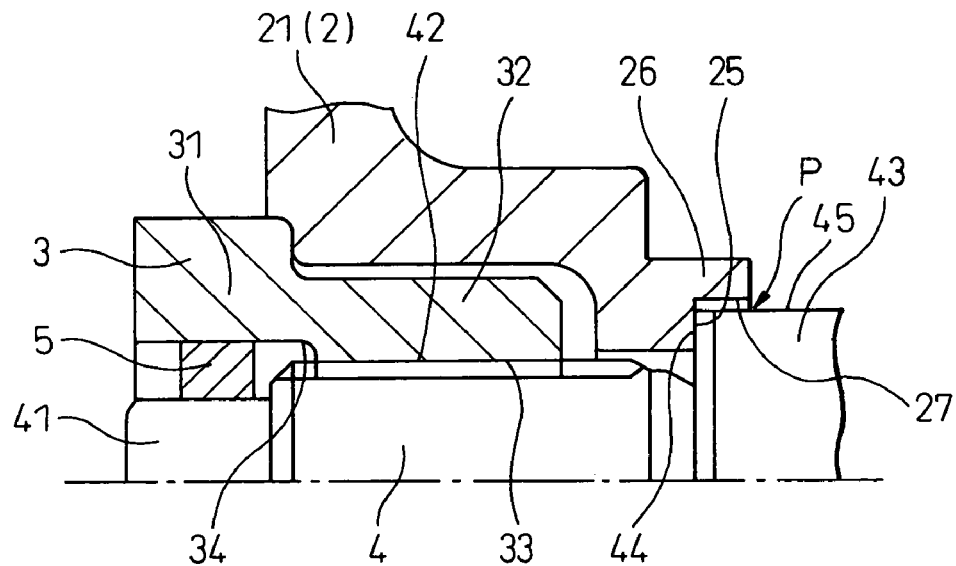
FIG. 6 is an enlarged sectional view of a primary portion of a power transmission device of a second embodiment of the present invention.

FIG. 6 is an enlarged sectional view of a primary portion of a power transmission device of the second embodiment of the present invention. In this second embodiment, a labyrinth structure is formed by changing a shape of the hub side seating face 25 of the hub 2 (the inner hub 21) coming into contact with the shaft side seating face 44 of the rotary shaft 4 without providing the washer 8. On the hub side seating face 25, an annular hub side flange portion 26, which protrudes in the axial direction from this hub side seating face 25, is provided. Accordingly, the seating faces 25, 44 of the hub 2 (the inner hub 21) and the rotary shaft 4 are contacted with each other. Further, a minute engagement gap is formed between the inner circumferential portion 27 of the hub side flange portion 26 and the outer circumferential face 45 of the large diameter shaft portion 43. In this way, in the second embodiment, the water intrusion path P, which is an engagement gap, is formed between the inner circumferential portion 27 of the hub side flange portion 26 and the outer circumferential face 45 of the large diameter shaft portion 43 and is directed in the axial direction. Therefore, the intrusion of water into the seating faces 25, 44 of both the hub 2 (the inner hub 21) and the rotary shaft 4 can be suppressed. Accordingly, it is possible to prevent the occurrence of corrosion with age. As the other points of the structure of the second embodiment are the same as those of the first embodiment, explanations are omitted here.

Figure 7:
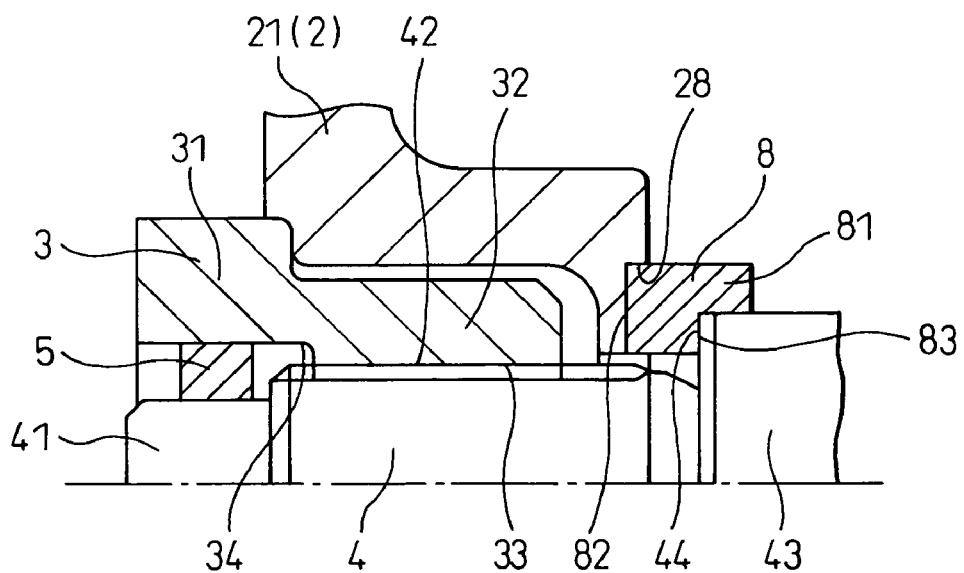
FIG. 7 is an enlarged sectional view of a primary portion of a power transmission device of a third embodiment of the present invention.

FIG. 7 is an enlarged sectional view of a primary portion of a power transmission device of the third embodiment of the present invention. In the first embodiment explained before, the hub side seating face 25 of the hub 2 (the inner hub 21) and the outside seating face 82 of the washer 8 are simply contacted with each other on planes. However, in the third embodiment, a recess portion is formed on the hub side seating face 25 of the hub 2 (the inner hub 21). This recess is a hub engagement portion 28. The outside seating face 82 of the washer 8 is press-fitted into this hub engagement portion 28. In this connection, in this third embodiment, the flange portion 81 is provided in the washer 8 in the same manner as that of the first embodiment, and the labyrinth structure is composed. As the other points of the structure of the third embodiment are the same as those of the first embodiment, the explanations are omitted here.

Figure 8:
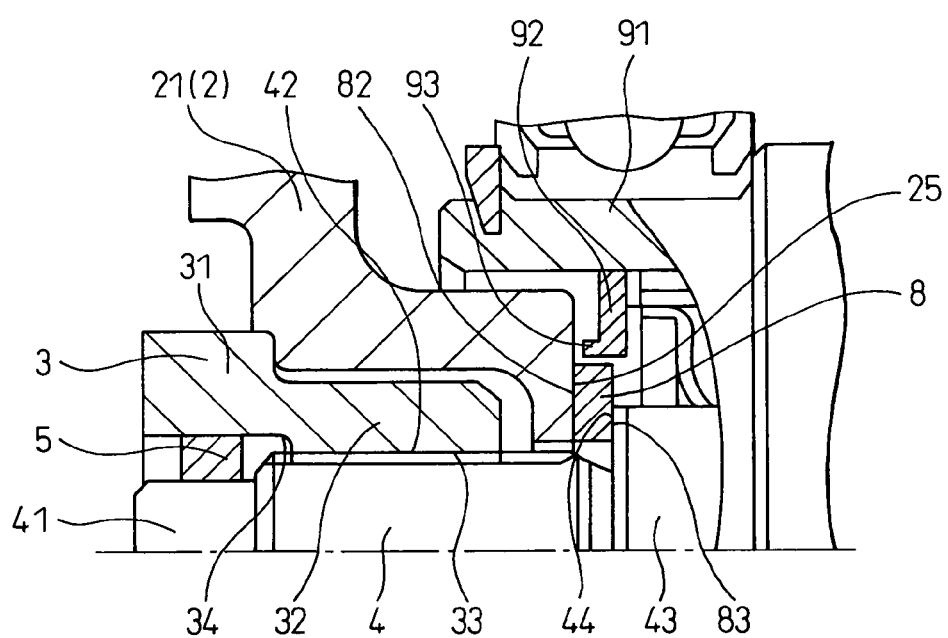
FIG. 8 is an enlarged sectional view of a primary portion of a power transmission device of a fourth embodiment of the present invention.

FIG. 8 is an enlarged sectional view of a primary portion of a power transmission device of the fourth embodiment of the present invention. In this fourth embodiment, when a ring member 92 is provided on the inner circumferential face of the boss portion 91 of the casing 9, a labyrinth structure is composed. The normal flat washer 8 is provided between the hub side seating face 25 of the hub 2 (the inner hub 21) and the shaft side seating face 44 of the rotary shaft 4 so that the flat washer 8 can be contacted with both seating faces 25, 44. A ring member 92 is arranged above the flat washer 8 so that a minute gap can be formed. The ring member 92 is formed into a ring shape, the cross section of which is a reverse L-shape, having a protruding portion 93, the forward end portion of which protrudes to the front side. By the existence of the ring member 92 having this protruding portion 93, the water intrusion path P is formed being bent to an L-shape, that is, the labyrinth structure is composed. The ring member 92 is made to adhere onto the inner circumferential face of the boss portion 91 by an appropriate adhesion means. In this fourth embodiment, the ring member 92 can be also used as a snap ring 10 of a tightly sealing device. As the other points of the structure are the same as each embodiment described before, the explanations are omitted here.

Figure 9:
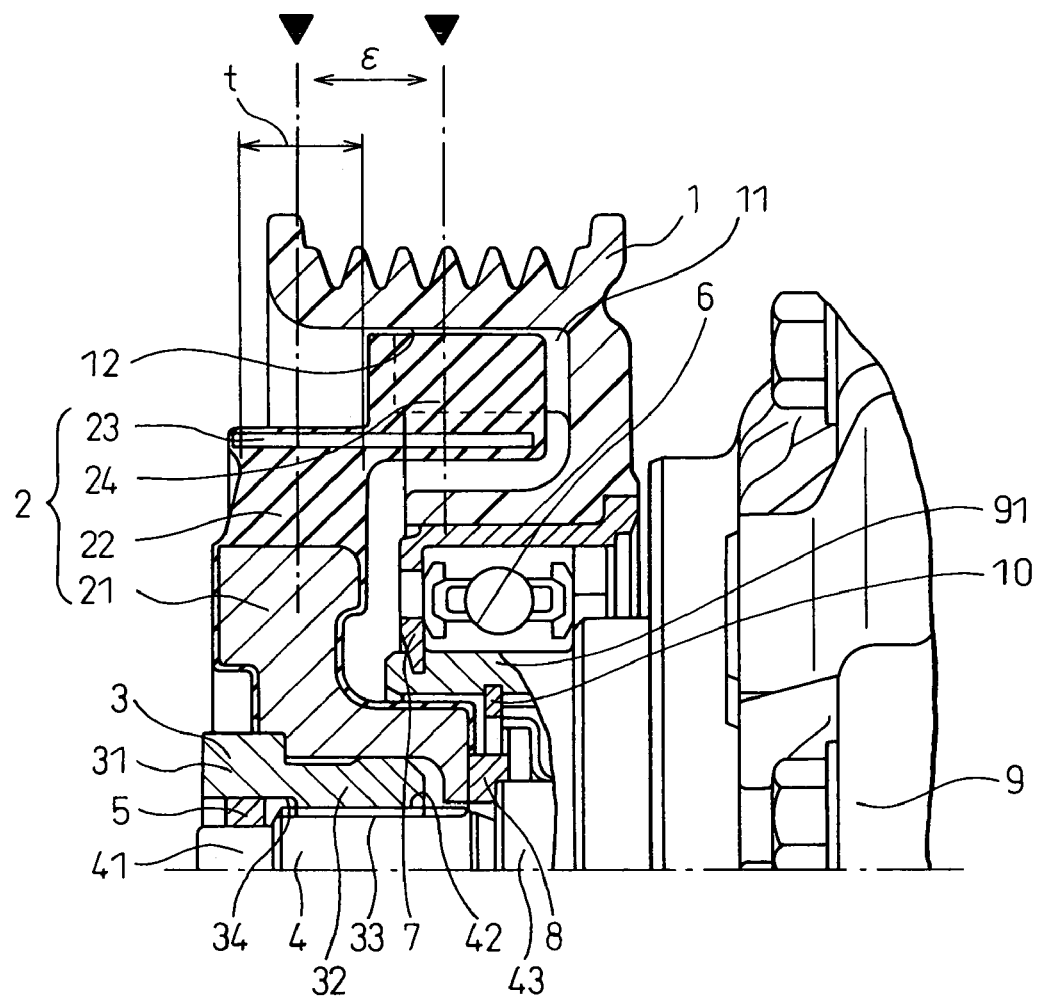
FIG. 9 is a sectional view showing an upper half of a power transmission device of a fifth embodiment of the present invention.

In the above explanations, the labyrinth structure of each embodiment is explained under the condition that the hub 2 of the power transmission device is composed in such a manner that the center β in the axial direction of the hub side protrusion and recess portion 24 and the center α in the axial direction of the cylindrical portion 22 substantially basically coincide with each other in the axial direction as shown in FIG. 1. However, as shown in the power transmission device of the fifth embodiment of FIG. 9, even in the hub 2 in which the center β in the axial direction of the hub side protrusion and recess portion 24 of the hub 2 is shifted from the center α in the axial direction of the cylindrical portion 22 by the offset ε, the labyrinth structure of each embodiment described above can be adopted. In FIG. 9, the labyrinth structure of the first embodiment is adopted, however, it is possible to adopt the labyrinth structures of the second to the fourth embodiment. It is preferable that the offset ε is not less than ¼ of the minimum wall thickness t of the cylindrical portion 22.

When the hub side protrusion and recess portion 24 and the cylindrical portion 22 are offset from each other, it is possible to ensure the space S in an upper portion on the front side of the outer hub 23. Therefore, it becomes possible to conduct drawing upon the outer circumferential portion (the outer circumferential portion of the cylindrical portion 22) of the outer hub 23. This drawing is conducted in order to enhance the durability of the elastic member. Further, when this space S is utilized, it is possible to arrange a balance weight (not shown).

In this connection, in each embodiment described above, material of a low friction coefficient, into which polyethylene fluoride (PTFE) or molybdenum is mixed, may be used for the outside seating face 82 and the inside seating face 83 of the washer 8, the shaft side seating face 44 of the rotary shaft 4 or the hub side seating face 25 of the hub 2 (the inner hub 21). Alternatively, in order to enhance the anti-corrosion property, plating may be conducted on those components.

Figure 10:
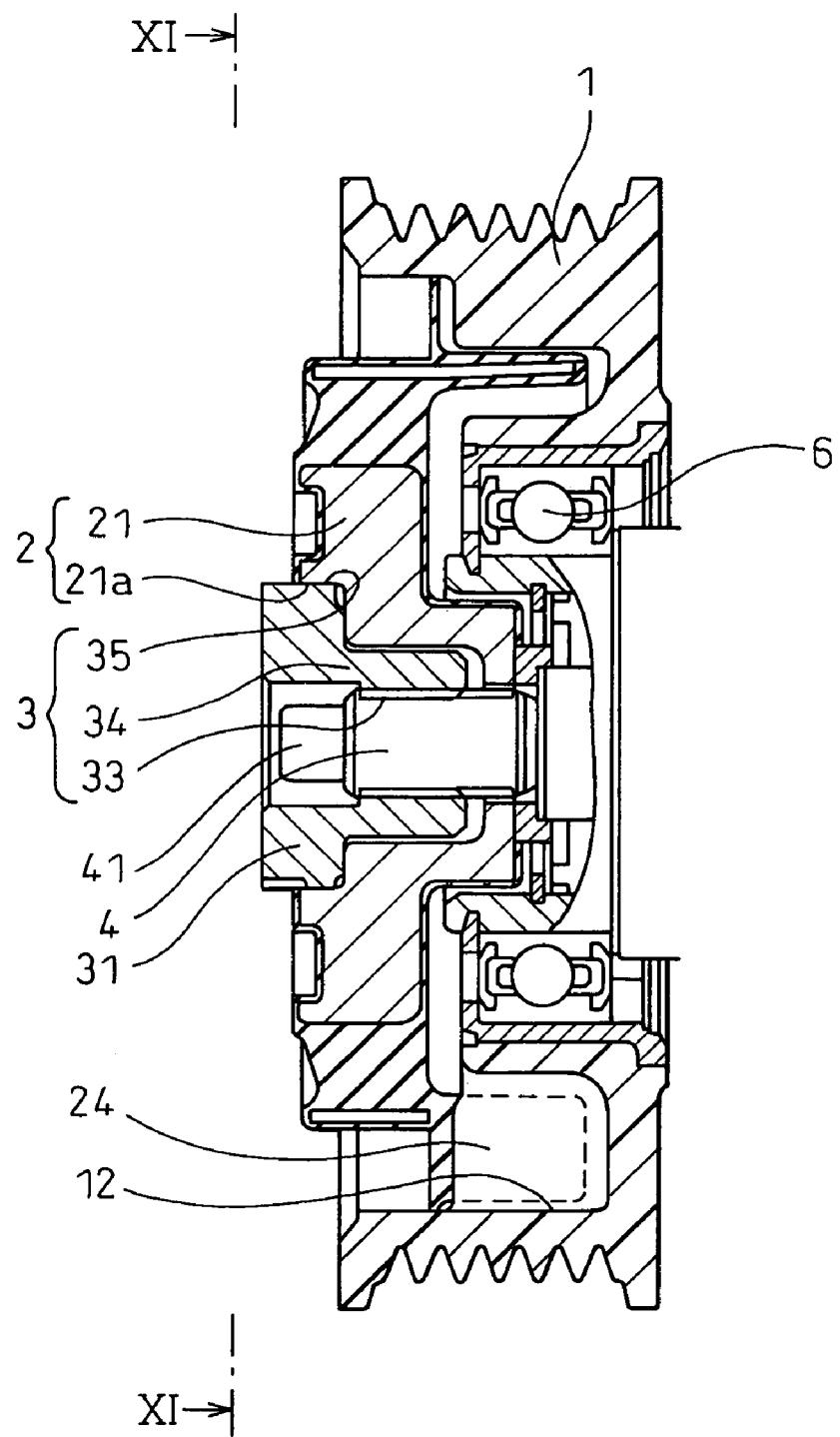
FIG. 10 is a longitudinal sectional view showing a sixth embodiment of a power transmission device of the present invention.
Figure 11:
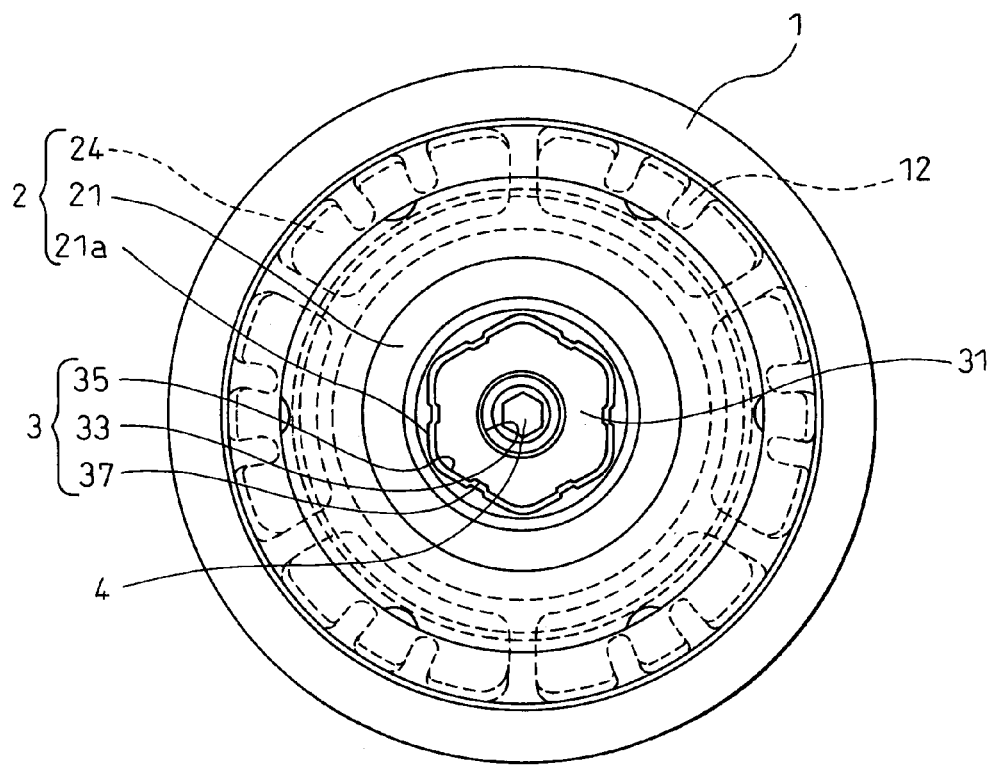
FIG. 11 is a front view taken on line XI-XI in FIG. 10.
Figure 12:
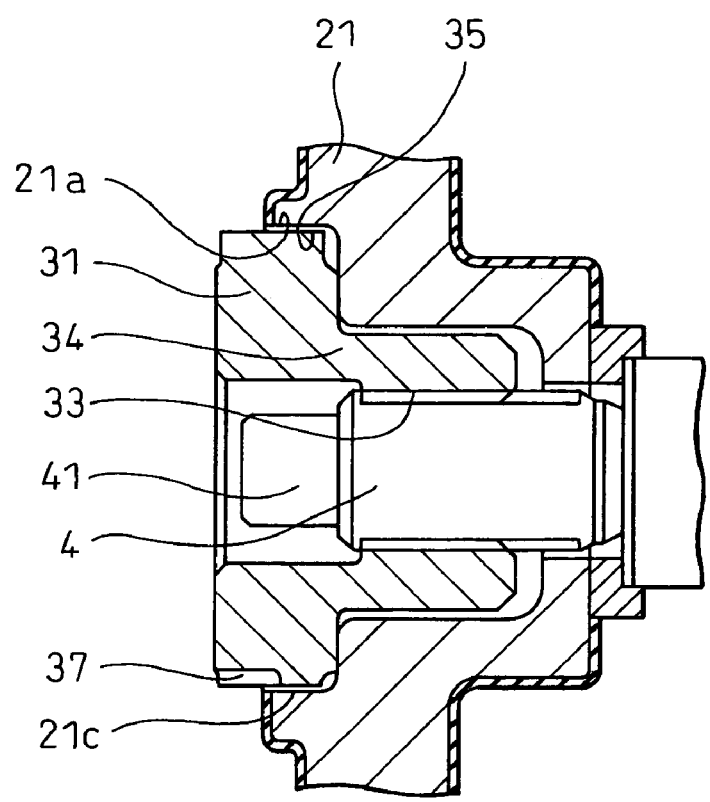
FIG. 12 is a partially enlarged view showing a neighborhood of a power shutoff member in FIG. 10.
Figure 13:
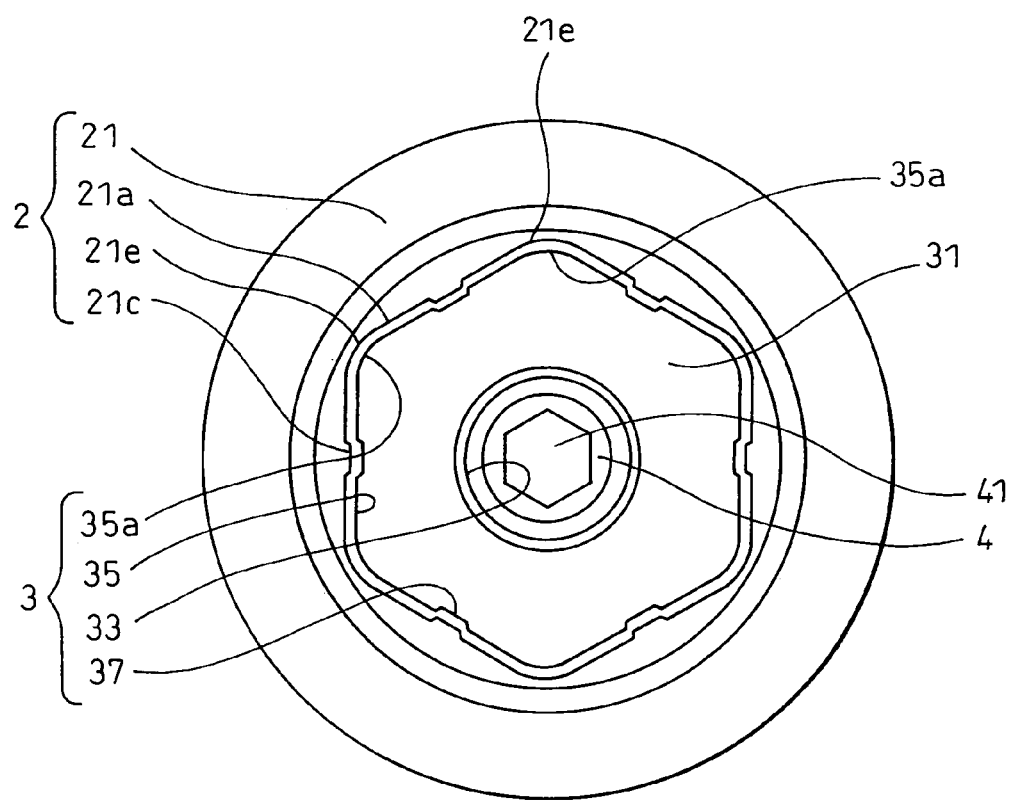
FIG. 13 is a partially enlarged view showing a neighborhood of the power shutoff member in FIG. 11.
Figure 14:
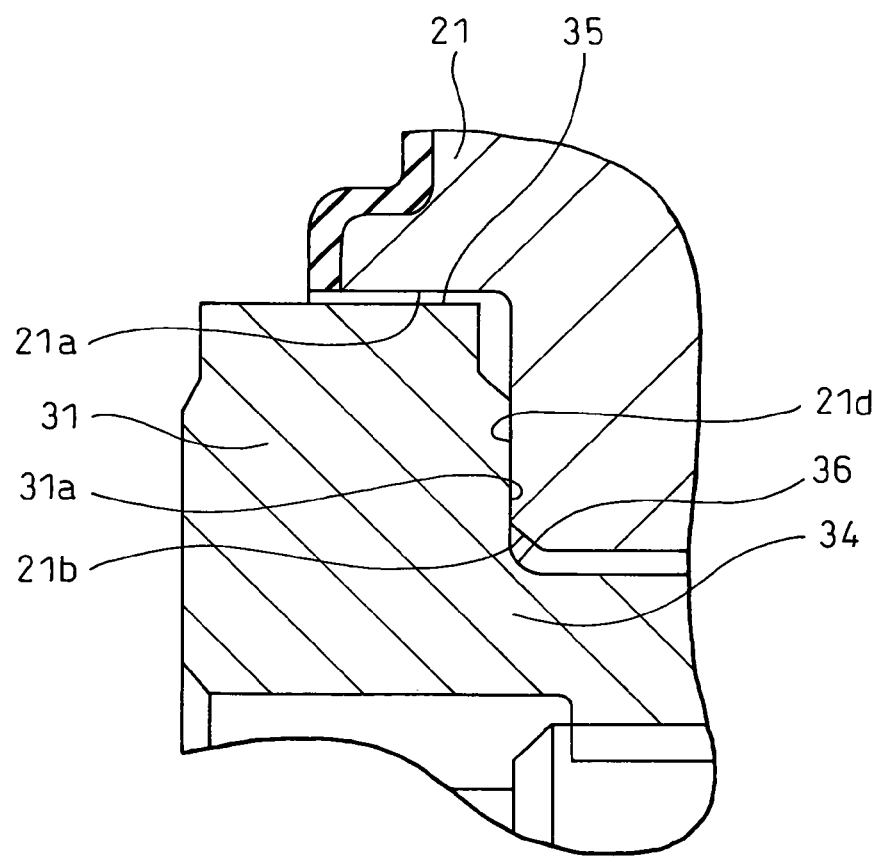
FIG. 14 is a partially enlarged sectional view showing an engagement portion of an inner hub with a power shutoff member in the sixth embodiment.
Figure 15:
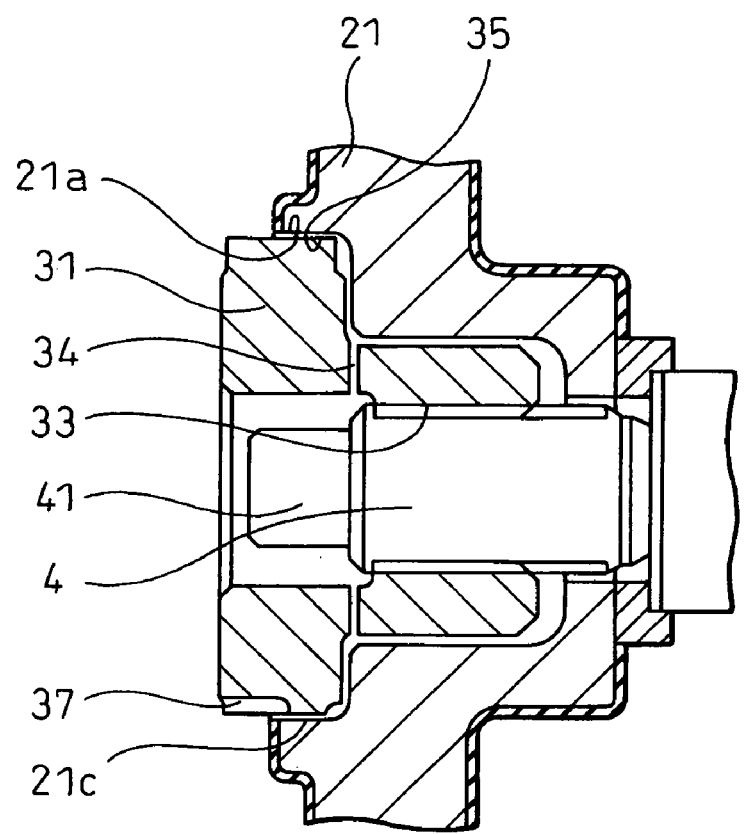
FIG. 15 is a partially sectional view showing a state in which a torque limiter of a power shutoff member is operated in the sixth embodiment.

FIG. 10 is a longitudinal sectional view showing the sixth embodiment of a power transmission device of the present invention. FIG. 11 is a front view taken on line XI-XI in FIG. 10. FIG. 12 is a partially enlarged view showing a neighborhood of a power shutoff member in FIG. 10. FIG. 13 is a partially enlarged view showing a neighborhood of a power shutoff member in FIG. 11. FIG. 14 is a partially enlarged sectional view showing an engagement portion of an inner hub with a power shutoff member in the sixth embodiment. FIG. 15 is a partially sectional view showing a state in which a torque limiter of a power shutoff member is operated in the sixth embodiment. Reference numerals of the components of the embodiments shown in FIGS. 10 to 15 correspond to the same components of the conventional example.

A power transmission device of the sixth embodiment of the present invention shown in FIG. 10 is used for an air conditioner for vehicle use. This power transmission device is a device for transmitting rotary power of an external drive source such as an engine to a compressor incorporated into an air conditioner for vehicle use. This power transmission device includes a power shutoff member (torque limiter) 3. In the power transmission device, power is transmitted from the outside to the pulley 1, which corresponds to a rotary portion described in claim, via a belt and others not shown in the drawing. When the hub side protrusion and recess portion 24, which is made of elastic material, arranged on the outer circumference of the hub 2 is engaged with the pulley side protrusion and recess portion 12, power is transmitted to the inner hub 21 of the hub 2. As can be clearly understood from FIG. 11, the pulley side protrusion and recess portion 12 and the hub side protrusion and recess portion 24 are engaged with each other when a plurality of protrusions and recesses, which correspond to each other, are engaged with each other. Power is further transmitted from the hub 2 to the power shutoff member 3. The inner hub engagement portion 21*a* of the inner hub 21 and the power shutoff member engagement portion 35 of the power shutoff member 3 are engaged with each other by a spigot engagement.

Torque is transmitted between the inner hub 21 and the power shutoff member 3 as follows. For example, as shown in the embodiment shown in FIG. 11 which is a front view of FIG. 10, when the engagement portion 35, the shape of which is hexagonal, of the power shutoff member 3 (the outer circumference of the large outer diameter portion 31) is engaged with the hexagonal engagement portion 21*a* of the hub 2 by spigot engagement, power is transmitted. Although not shown in this embodiment, torque may be transmitted by a shape which is not a circle, such as a square, a width across flat, an octagon, a decagon or a dodecagon. After power has been transmitted from the hub 2 to the power shutoff member 3, it is transmitted from the power shutoff member 3 to the rotary shaft 4 of a compressor (not shown), which is joined to the power shutoff member 3 by means of screwing, in this embodiment. In this way, the compressor is driven and rotated.

In FIG. 11, the engagement portion 21*a* of the inner hub and the engagement portion 35 of the power shutoff member 3 are engaged with each other by means of a spigot engagement. However, in order to prevent the large outer diameter portion 31 of the power shutoff member 3 from falling off at the time of operation of the torque limiter of the power shutoff member 3, the caulking portion 21*c* is provided in the inner hub 21 so as to prevent the large outer diameter portion 31 from falling off. Referring to FIGS. 12 and 13 which are enlarged views of the periphery of the power shutoff member 3, in order to prevent stress from being generated in the power shutoff member 3 by caulking, the caulking recess portions 37 (6 portions in this embodiment) are provided in the portion of the large outer diameter portion 31 of the power shutoff member 3 corresponding to the caulking portions 21*c*. As can be clearly understood from FIG. 13, in the case of the hexagonal engagement portion 21*a* of the hub 2, it is preferable that one caulking portion 21*c* is provided on each side of the hexagon, that is, six caulking portions are provided, on the sides of the hexagon, in total. However, the number of the caulking portions may be larger or smaller than that. Of course, when the shape of the engaging portion 21*a* of the hub 2 is different, the number of the caulking portions 21*c* may be different. In this embodiment, caulking conducted by the caulking portion 21*c* and the caulking recess portion 37 is not a state of press-fitting but a state of non-contact. Therefore, when the power shutoff member 3 is broken and the large outer diameter portion 31 is going to fall off, the engagement portion 35 of the large outer diameter portion 31 is hooked by at least some of the plurality of caulking portions 21*c*, the shapes of which are protrusions. Therefore, the large outer diameter portion 31 can be prevented from falling off.

FIG. 14 is an enlarged view of the engagement portion of the hub 2 with the power shutoff member 3. As can be clearly understood from FIG. 14, the hub 2 and the power shutoff member 3 are opposed to each other in such a manner that the respective engagement portions 21*a*, 35 are adjacent and opposed to each other. In the axial direction of the rotary shaft 4, the outer face 21*d* of the flange portion of the hub 2 and the inner face 31*a* of the large outer diameter portion 31 of the power shutoff member 3 are contacted with each other in the axial direction of the rotary shaft 4. As the power shutoff member 3 is rotated in a direction so that the power shutoff member 3 can be screwed into the rotary shaft 4, when the inner face 31*a* of the power shutoff member 3 collides with the outer face 21*d* of the hub and receives a reaction force, torque is proportionally converted into an axial tension and acts on the rotary shaft 4. Therefore when torque is increased, the axial tension is also increased. When the torque exceeds a predetermined value, the power shutoff member 3 is broken at the breaking portion 34 by the increased axial tension.

On the other hand, in order to insert the power shutoff member 3 into the inner hub 21, chamfered shapes 21*b* such as a rounded shape and a plane shape are formed in the inner hub 21. In the power shutoff member 3, the root-rounded portion 36 is provided. When the inner hub 204 and the power shutoff member 3 are shifted from each other in the axial direction, the chamfered portion 21*b* and the root-rounded portion 36 interfere with each other. Therefore, stress can not be uniformly generated in the breaking portion 34 of the power shutoff member 3, and the power shutoff performance fluctuates greatly. Accordingly, in order to prevent the interference of the chamfered portion 21*b* with the root-rounded portion 36, it is necessary to prevent an axial shift caused between the inner hub 21 and the power shutoff member 3. Therefore, when tolerance of the gap of spigot engagement is prescribed, an axial shift, which affects the power shutoff performance, is prevented. It is preferable that a gap of spigot engagement is not less than 0.001 mm and an upper limit is 15% of the diameter of the engagement portion 35 of the power shutoff member 3. Further, it is preferable that the upper limit is 3 mm at the maximum. As can be clearly understood from FIG. 13, in this embodiment, an objective gap of spigot engagement is a gap formed between the corner portion 35a of the engagement portion 35 of the power shutoff member 3 and the corner portion 21e of the engagement portion 21a of the hub 2. Both the corner portion 35a the engagement portion 35 of the power shutoff member 3 and the corner portion 21e of the engagement portion 21a of the hub 2 are formed into a circle on the cross section shown in FIG. 13. Accordingly, a diameter of the engagement portion 35 of the power shutoff member 3, which becomes a reference of the prescription of the upper limit, is a diameter of the circumscribed circle at the corner portion 35a. On the hub side corresponding to this circumscribed circle in the spigot engagement, it is a diameter of the inscribed circle at the corner portion 21e.

FIG. 15 is a view showing a state in which the torque limiter of the power shutoff member 3 is operated. In the case where the power shutoff member 3 is cut off at the breaking portion 34 and the transmission of power is shut off, a state, in which the screw portion 33 of the power shutoff member 3 is joined to the rotary shaft 4 of a compressor, can be maintained, and there is no possibility that the screw portion 33 will fall off. However, the large outer diameter portion 31 will fall off when it is in this state. In this embodiment, a caulking joining portion is provided in the spigot engagement portion as described above. In order to conduct caulking in such a manner that the generation of redundant stress in the power shutoff member 3 can be prevented, the caulking recess portion 37 is provided in the power shutoff member 3.

Figure 16:
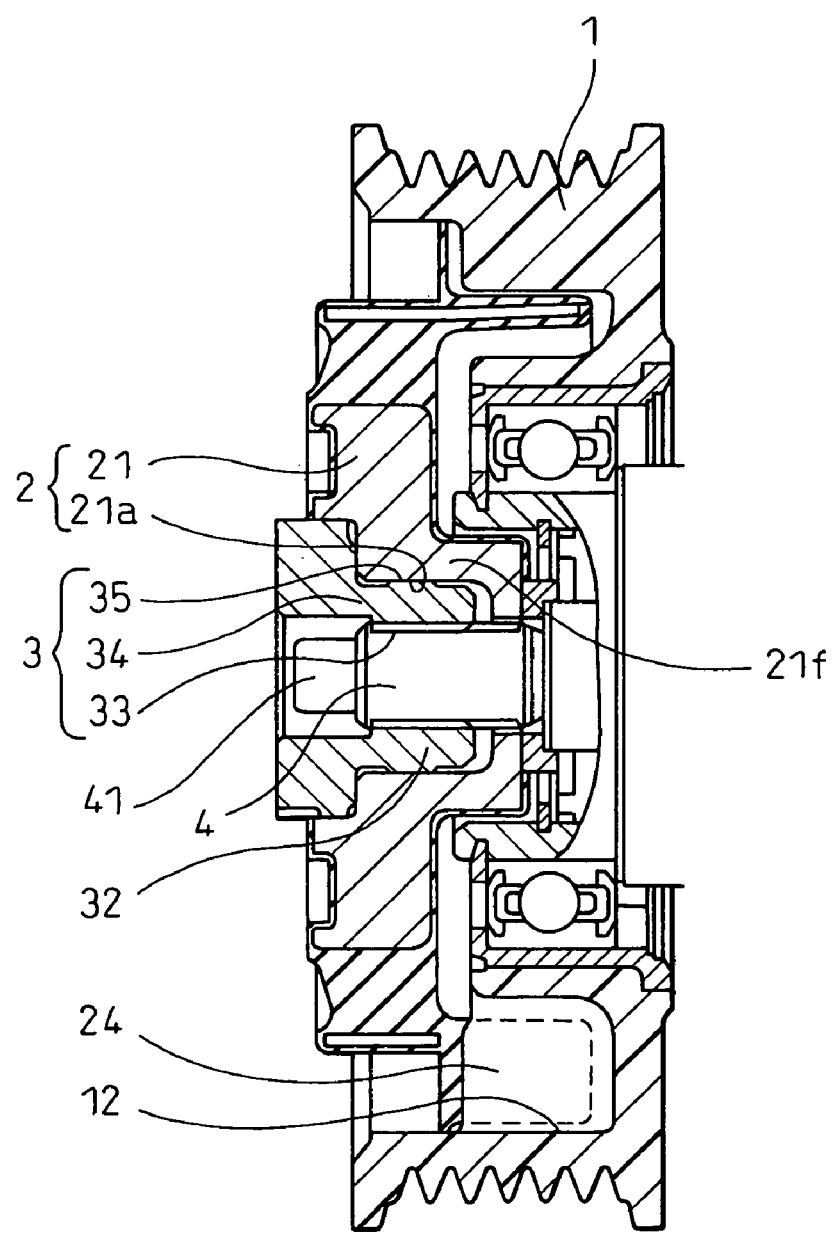
FIG. 16 is a longitudinally sectional view of a seventh embodiment of the present invention.
Figure 17:
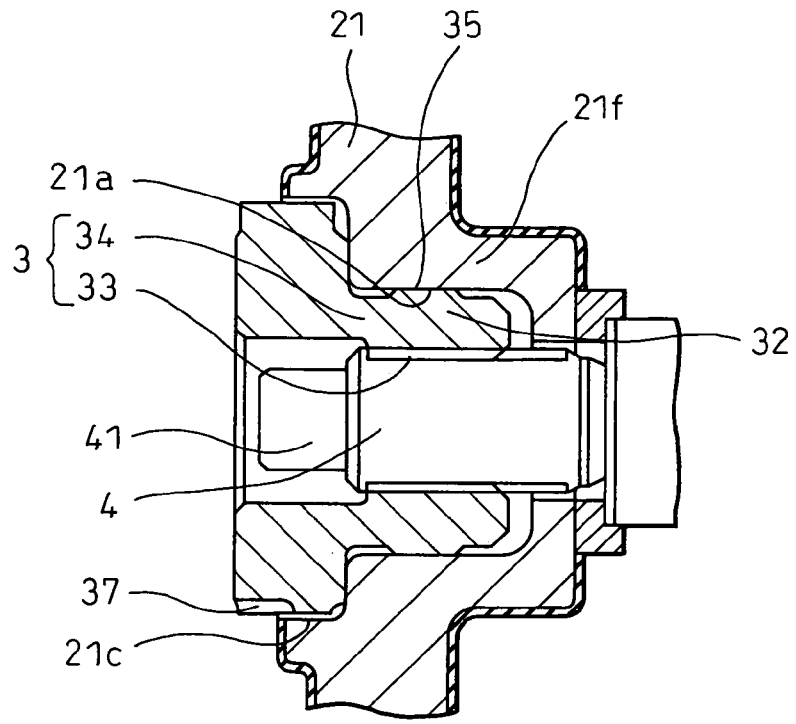
FIG. 17 is an enlarged view of FIG. 16.

FIG. 16 is a longitudinally sectional view of the seventh embodiment of the present invention, and FIG. 17 is an enlarged view of FIG. 16. Referring to FIGS. 16 and 17, like reference characters are used to indicate like parts in FIGS. 10 to 15, in which the sixth embodiment is shown, and in FIGS. 16 and 17 in which the seventh embodiment is shown. In the seventh embodiment, the engagement portion 35 of the power shutoff member 3, which is subjected to spigot engagement, is not provided in the large outer diameter portion 31 like the sixth embodiment but provided in the small outer diameter portion 32, and the engagement portion 21a on the inner hub side 21 is provided in the recess portion 21f. As described above, in this embodiment, the spigot engagement portion is arranged closer to the rotary shaft side than the power shutoff portion of the power shutoff member 3.

In this case, the size and tolerance of the spigot engagement portion are the same as those of the sixth embodiment described before. Material of a low friction coefficient may be applied to the engagement portion and surface treatment may be conducted on the engagement portion so that an axial shift can be prevented. Points of the structure of this embodiment except for the above points are the same as those of the sixth embodiment. Therefore, the explanations are omitted here.

Figure 18:
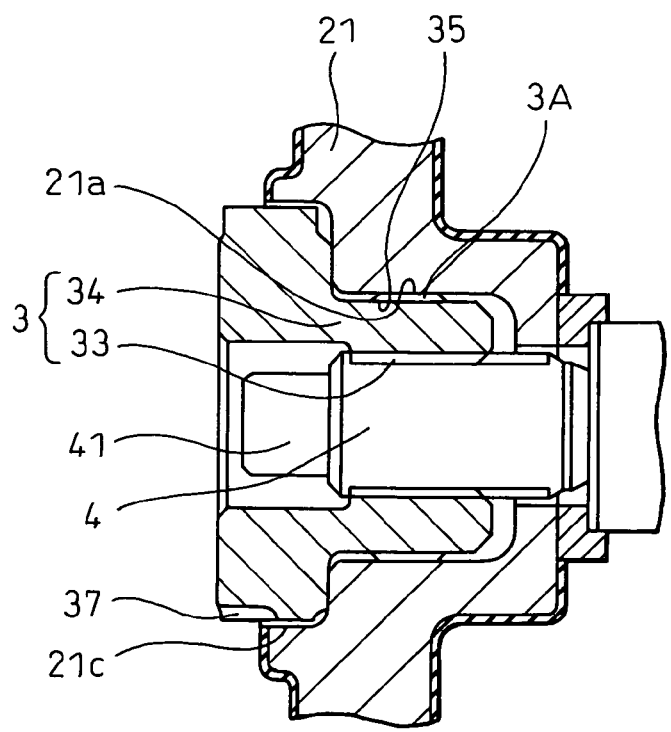
FIG. 18 is a longitudinally sectional view of an eighth embodiment of the present invention.

FIG. 18 is a partially sectional view of the eighth embodiment of the present invention. In this embodiment, a separate part is arranged in the engagement portion between the inner hub 21 and the power shutoff member 3. Referring to FIG. 18, like reference characters are used to indicate like parts in FIGS. 10 to 15, which show the sixth embodiment, and FIG. 18 which shows the eighth embodiment. The spigot engagement portion 35 of the power shutoff member 3 of the eighth embodiment is not integrated with the power shutoff member 3 into one body, unlike in the sixth and the seventh embodiment. In the eighth embodiment, a ring 3A, which is a separate body, is attached to the engagement portion by means of press-fitting, welding or adhesion. In this embodiment, even when the accuracy of the gap is not so high, unlike in the sixth and the seventh embodiment described before, the ring 3A may be a part made of material of a low friction coefficient such as PTFE. Alternatively, the ring 3A may be a part which is subjected to surface treatment of resin or molybdenum effective for sliding. The ring 3A may be attached to the hub 2 side. Further, the ring 3A may be attached but not connected (joined). Points of the structure of this embodiment except for the above points are the same as those of the seventh embodiment. Therefore, explanations are omitted here.

Figure 19:
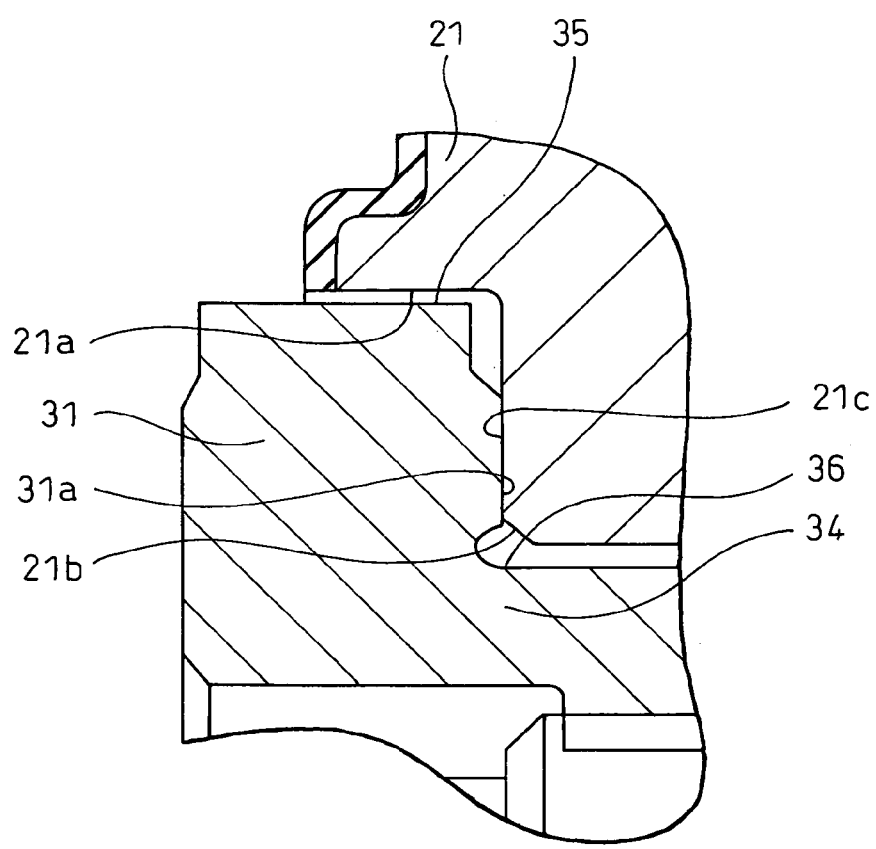
FIG. 19 shows another embodiment of the present invention, that is.
Figure 20:
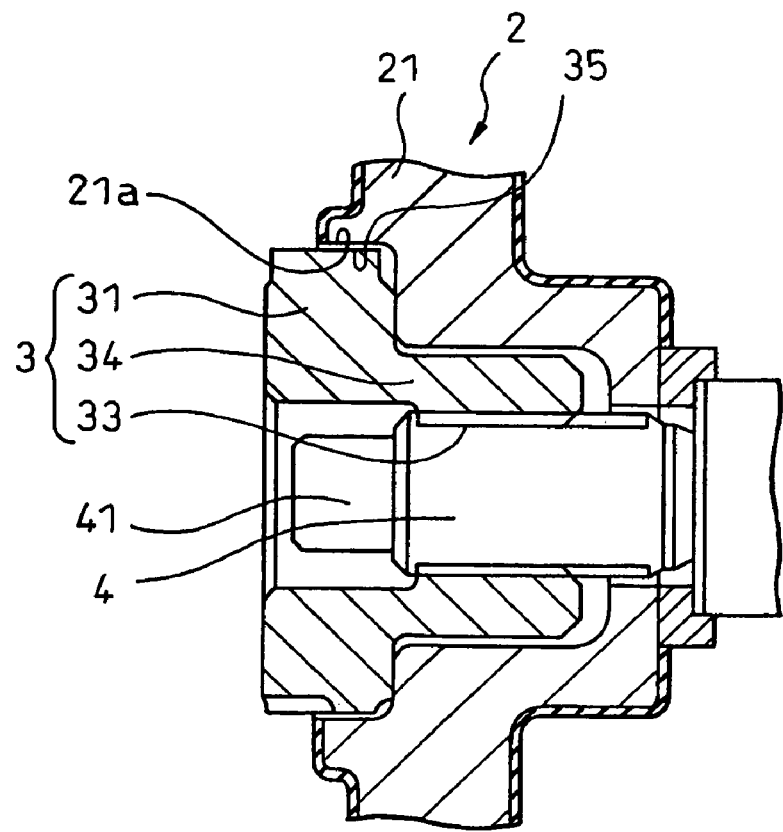
FIG. 20 is a sectional view of a comparative example of a power transmission device having the above torque limiter (the power shutoff member)
Figure 21:
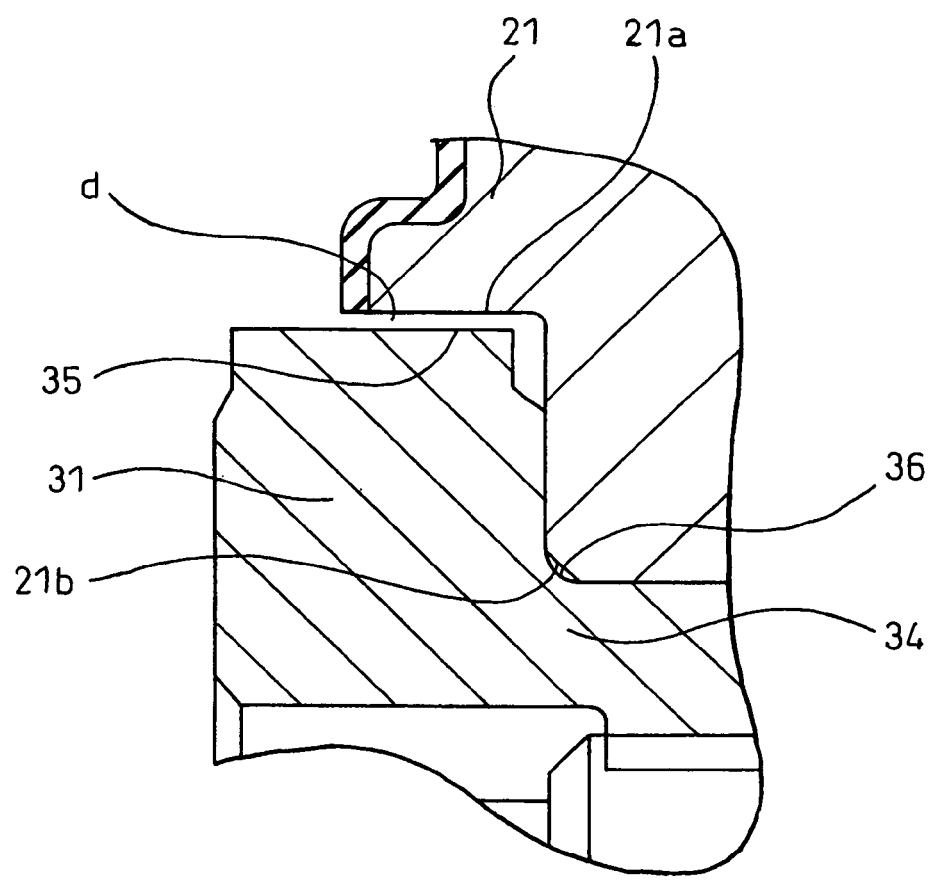
FIG. 21 is a partially enlarged view of FIG. 20.
Figure 22:
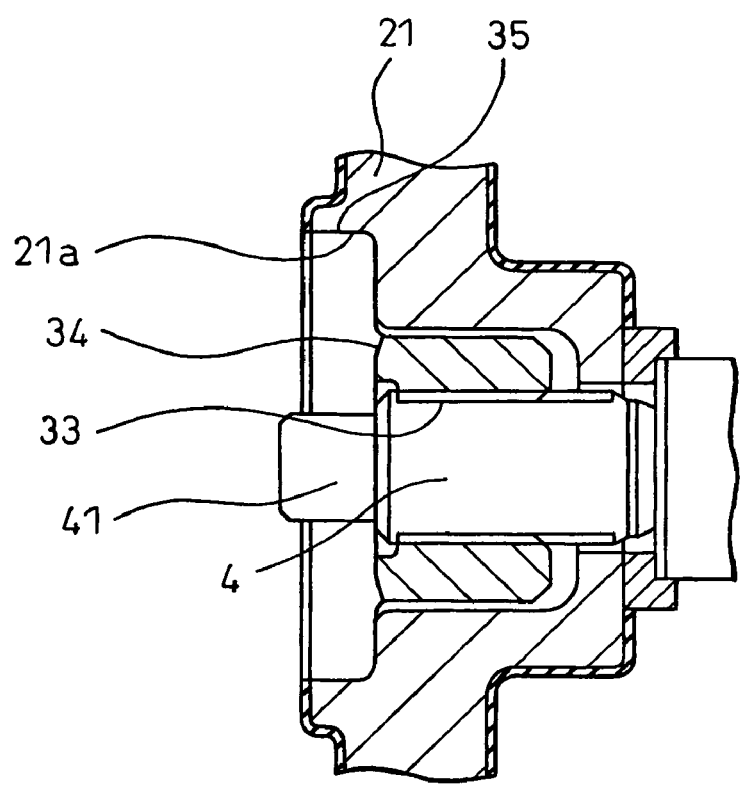
FIG. 22 is a partial sectional view showing a state in which a torque limiter is operated in the comparative example.

FIG. 19 shows another embodiment of the present invention, that is, FIG. 19 is a partially enlarged sectional view showing an engagement portion of the inner hub 2 with the power shutoff member 3 formed in the same manner as that of FIG. 14. In this embodiment, the root-rounded portion 36, which is arranged on the overall circumference in the periphery of the inside root portion of the outer face 21c of the hub, is formed into a groove-shape. It is preferable that the root-rounded portion 36 has a semicircular cross section, however, as long as it is formed into a groove-shape, any cross section may be used. When the root-rounded portion 36 is formed into a groove-shape as described above, the chamfered shape 21b, which is a corner portion of the inner hub 21 side opposed to the root-rounded portion 36, and the root-rounded portion 36 can be positively prevented from coming into contact and interfering with each other. Points of the structure of this embodiment except for the above points are the same as those of the sixth embodiment. Therefore, the explanations are omitted here.

Next, the effects and actions of the above embodiments will be explained below.

The following effects can be expected by the power transmission of the sixth embodiment of the present invention. In the torque limiter type power transmission device in which the screw joining is utilized, when the power shutoff member and the engagement portion of the inner hub, in which the power shutoff member is accommodated, are finished by a predetermined tolerance and engaged with each other by means of spigot engagement, it is possible to prevent the occurrence of an axial shift between the power shutoff member and the inner hub. Therefore, the power shutoff characteristic can be stabilized.

When the engagement portion of the inner hub is formed into a joining structure in which the portion is a little caulked, it is possible to prevent the large outer diameter portion of the power shutoff member from falling off after the completion of operation of the torque limiter.

Due to the foregoing, it is possible to supply a power transmission device of high performance at a low manufacturing cost.

The power transmission device of the seventh embodiment of the present invention can exhibit the same effect as that of the sixth embodiment.

In addition to the effect provided by the sixth embodiment, the power transmission device of the eighth embodiment of the present invention can provide the following effects.

Even when the tolerance of spigot engagement of the inner hub with the power shutoff member is not severely controlled, the power shutoff characteristic can be stabilized.

Accordingly, the power transmission device can be more easily manufactured and assembled, which reduces the manufacturing cost.

In the above embodiments, the power transmission device of the present invention is applied to a compressor incorporated into an air conditioner for vehicle use. However, it should be noted that the present invention is not limited to the above specific use, that is, the present invention is not limited to the use for an air conditioner for vehicle use.

In the embodiments described above or shown in the accompanying drawings, power generated by a power source is transmitted via a mechanism including a belt and pulley. However, it should be noted that the present invention is not limited to the above specific power transmitting mechanism, for example, power generated by a power source may be transmitted via another power transmitting mechanism such as gears and others.

While the invention has been described by reference to specific embodiments chosen for purposes of illustration, it should be apparent that numerous modifications could be made thereto by those skilled in the art without departing from the basic concept and scope of the invention.

The invention claimed is:

1. A power transmission device comprising:
   a pulley rotationally attached to a casing of a compressor;
   a hub connected to the pulley by an engagement of protrusions with recesses; and
   a power shutoff member, which is interposed between the hub and a rotary shaft of the compressor, to shut off a transmission of an excessively high torque between the rotary shaft and the pulley, wherein
   an inner circumferential face of the power shutoff member and an outer circumferential face of the rotary shaft are joined to each other by a screw engagement, and a water intrusion path, which is formed between a hub side seating face of the hub and a shaft side seating face of the rotary shaft, is formed into a labyrinth structure, to suppress intrusion of water into the seating face, and
   the labyrinth structure is formed when an annular flange portion, which protrudes an axial direction toward the casing of the compressor, is provided in a washer, which is arranged between the hub side seating face of the hub and the shaft side seating face of the rotary shaft.

2. A power transmission device according to claim 1, wherein an engagement portion for partially receiving the washer is formed on the hub side seating face.

3. A power transmission device according to claim 1, the hub including: an inner hub engaged with and fixed to an outer circumference of the power shutoff member; a ring-shaped outer hub arranged outside the inner hub; a cylindrical portion, which is interposed between the inner hub and the outer hub, made of an elastic member held by both the inner hub and the outer hub; and a hub side protrusion and recess portion, which is fixed to an upper face of the outer hub, made of an elastic member engaged with the pulley by a protrusion and recess engagement, wherein the center $\beta$ in the axial direction of the hub side protrusion and recess portion is offset to the rear side by the offset $\epsilon$ from the center $\alpha$ in the axial direction of the cylindrical portion.

* * * * *